(12) United States Patent
Ng

(10) Patent No.: US 8,837,416 B2
(45) Date of Patent: *Sep. 16, 2014

(54) METHOD FOR DETECTING A DOWNLINK CONTROL STRUCTURE FOR CARRIER AGGREGATION

(75) Inventor: Boon Loong Ng, Mulgrave (AU)

(73) Assignee: NEC Corporation, Tokyo (JP)

( * ) Notice: Subject to any disclaimer, the term of this patent is extended or adjusted under 35 U.S.C. 154(b) by 45 days.

This patent is subject to a terminal disclaimer.

(21) Appl. No.: 13/619,060

(22) Filed: Sep. 14, 2012

(65) Prior Publication Data

US 2013/0010736 A1    Jan. 10, 2013

Related U.S. Application Data

(62) Division of application No. 13/389,828, filed as application No. PCT/JP2010/063444 on Aug. 2, 2010, now Pat. No. 8,565,180.

(30) Foreign Application Priority Data

Aug. 14, 2009 (AU) ................ 2009903831

(51) Int. Cl.
*H04W 72/04* (2009.01)
(52) U.S. Cl.
USPC .......................................... 370/329
(58) Field of Classification Search
CPC .................................................. H04W 72/04
See application file for complete search history.

(56) References Cited

U.S. PATENT DOCUMENTS

| | | |
|---|---|---|
| 2010/0215011 A1 | 8/2010 | Pan et al. |
| 2010/0232373 A1 | 9/2010 | Nory et al. |
| 2010/0254268 A1 | 10/2010 | Kim et al. |
| 2010/0272019 A1 | 10/2010 | Papasakellariou et al. |
| 2010/0303011 A1 | 12/2010 | Pan et al. |
| 2010/0322158 A1 | 12/2010 | Lee et al. |
| 2011/0044239 A1 | 2/2011 | Cai et al. |
| 2011/0044259 A1 | 2/2011 | Nimbalker et al. |
| 2011/0044261 A1 | 2/2011 | Cai et al. |
| 2011/0110316 A1* | 5/2011 | Chen et al. ............ 370/329 |
| 2011/0141985 A1 | 6/2011 | Larsson et al. |
| 2011/0194514 A1 | 8/2011 | Lee et al. |
| 2011/0274066 A1 | 11/2011 | Tee et al. |
| 2012/0140746 A1 | 6/2012 | Zhu et al. |

FOREIGN PATENT DOCUMENTS

| | | |
|---|---|---|
| CN | 101136726 A | 3/2008 |
| CN | 101483828 A | 7/2009 |
| JP | 2012235522 A | 11/2012 |
| JP | 2012531067 A | 12/2012 |
| KR | 10-2009-0083269 A | 8/2009 |

OTHER PUBLICATIONS

Office Action dated Sep. 10, 2013 issued by the Japanese Patent Office in counterpart Japanese Application No. 2012273069.

(Continued)

*Primary Examiner* — Sulaiman Nooristany
(74) *Attorney, Agent, or Firm* — Sughrue Mion, PLLC

(57) ABSTRACT

This invention relates with a method for detecting a downlink control structure for carrier aggregation in communication network in which data transmission is scheduled by a physical downlink control channel (PDCCH). An UE receives higher layer signaling enabling carrier aggregation for the UE. The UE reads the PDCCHs of component carriers (CCs), wherein the downlink control information (DCI) in the PDCCHs of each CC is read according to one of a plurality of predefined formats derived from the higher layer signaling.

12 Claims, 4 Drawing Sheets

(56) References Cited

OTHER PUBLICATIONS

Office Action dated Aug. 27, 2013 issued by the Japanese Patent Office in counterpart Japanese Application No. 2012273065.
3GPP TSG-RAN WG1 Meeting #57, "Primary and Secondary PDCCH Design for LTE-A," ZTE, Discussion, May 4-8, 2009, R1-091707, 12 pages total.
European Search Report dated Jun. 3, 2013 issued by the European Patent Office in counterpart European Application No. 10808192.
European Search Report dated Jun. 3, 2013 issued by the European Patent Office in counterpart European Application No. 13150829.
European Search Report dated Jun. 3, 2013 issued by the European Patent Office in counterpart European Application No. 13150830.
3GPP TSG-RAN WG1 #54, "General control channel design for LTE-A", Aug. 18-22, 2008 R1-082848; 3 pages total.
Nokia et al; 3GPP TSG-RAN WG1 #57, "DL control signaling to support extended bandwidth", May 4-8, 2009; R1-092141; 7 pages total.
Japanese Office Action issued Aug. 23, 2012 in corresponding Japanese Patent Application No. 2012-506012.
Motorola, "Comparison of PDCCH Structures for Carrier Aggregation", R1-091326, 3GPP, 5 pages, Mar. 27, 2009.
Catt, "DL Control Channel Scheme for LTE-A", R1-091524, 3GPP, 5 pages, Mar. 27, 2009.
Catt, "DL Control Channel Scheme for LTE-A", R1-091994, 3GPP, 4 pages, May 8, 2009.
3GPP TSG RAN WG1 #57bis, "PHICH for Multi-Carrier Operation", Qualcomm, Jun. 29-Jul. 3, 2009, 6 pages, R1-092707.
3GPP TSG RAN WG1 Meeting #57b, "Carrier Indication for Carrier Aggregation", Research in Motion, UK Limited, Jun. 29-Jul. 3, 2009, 4 pages, R1-092417.
3GPP TSG-RAN WG1 Meeting #57bis, "Multiple Component Carriers and Carrier Indication", InterDigital, Jun. 29-Jul. 3, 2009, 5 pages, R1-092589.
Japanese Office Action issued Aug. 28, 2012 in corresponding Japanese Patent Application No. 2012-506012.
3GPP TSG WG2 #66bis, "General issues on carrier aggregation", Samsung, Discussion and Decision, Jun. 29-Jul. 3, 2009, R2-093903, 4 pages.
3GPP TSG RAN2 #66bis, "Component carrier configuration/ activation for carrier aggregation", NEC, Dicussion and Decision, Jun. 29-Jul. 3, 2009, R2-093697, 3 pages.
3GPP TSG RAN2 #66, "Some Aspects on Carrier Aggregation", LG Electronics Inc., Discussion and Decision, May 4-8, 2009, R2-093214, 3 pages.
Notice of Reasons for Refusal, dated May 21, 2013, issued by the Japanese Patent Office in counterpart Japanese Application No. 2012-170085.
3GPP TSG RAN WG1 Meeting #58, "Further refinement to DL control signalling for carrier aggregation", NEC Group, Discussion and Decision, Aug. 24-28, 2009, R1-093226, 4 pages.
3GPP TSG-RAN WG1 Meeting #58, "Views on PDCCH Carrier Indicator", NEC Group, Discussion and Decision, Aug. 24-28, 2009, R1-093225, 3 pages.
3GPP TSG RAN WG1 #57bis, "Component carrier indication by PDCCH for multiple carrier aggregation in LTE-Advanced", LG Electronics, Discussion and decision, Jun. 29-Jul. 3, 2009 R1-092500, 4 pages.
3GPP TSG RAN WG1 #57, "Downlink and Uplink Control to Support Carrier Aggregation", Texas Instruments, Discussion and Decision, May 4-8, 2009, R1-091838, 5 pages.
3GPP TSG RAN WG1 Meeting #56, "PDCCH design for carrier aggregation", Huawei, Discussion, Feb. 9-13, 2009, R1-090815, 5 pages.
3GPP TSG RAN WG1 Meeting #55, "Downlink data and control structure for LTE-A", ZTE, Discussion, Nov. 10-14, 2008, R1-084113, 5 pages.

3GPP TSG RAN WG1 #57, "Control channel design for the support of wider bandwidth for LTE-Advanced", May 4-8, 2009 R1- 091923, 11 pages.
3GPP TSG RAN WG1 54bis, "Issues on Carrier Aggregation for Advanced E-UTRA" Texas Instruments, Discussion and Decision, Sep. 29-Oct. 3, 2008, R1-083528, 6 pages.
European Search Report, dated Jun. 3, 2013, issued by the European Patent Office in counterpart European Application No. 12181489.1.
European Search Report, dated Jun. 3, 2013, issued by the European Patent Office in counterpart European Application No. 12181492.5.
European Search Report, dated Jun. 3, 2013, issued by the European Patent Office in counterpart European Application No. 12181493.3.
Notice of Allowance, dated Mar. 12, 2013, issued by the United States Patent and Trademark Office in counterpart U.S. Appl. No. 13/389,828.
Non Final Office action, dated Nov. 21, 2012, issued by the United States Patent and Trademark Office in counterpart U.S. Appl. No. 13/389,828.
Texas Instrument, "Issues on Carrier Aggregation for Advanced E-UTRA", 3GPP TSG RAN WG1 #55bis, Discussion and Decision, Jan. 12-16, 2009, pp. 1-5, R1-090280.
Texas Instrument, "Downlink and Uplink Control to Support Carrier Aggregation", 3GPP TSG RAN WG1 #56, Discussion and Decision, Feb. 9-13, 2009, pp. 1-5, R1-090584.
Texas Instrument, "Downlink and Uplink Control to Support Carrier Aggregation", 3GPP TSG RAN WG1 #56bis, Discussion and Decision, Mar. 23-27, 2009, pp. 1-5, R1-091295.
Qualcomm Europe, "Multicarrier Control for LTE-A", 3GPP TSG RAN WG1 #57bis, Discussion, Jun. 29-Jul. 3, 2009, pp. 1-2, R1-092703.
Panasonic, "Further discussion of PDCCH for carrier aggregation", 3GPP TSG-RAN WG1 Meeting #57bis, Discussion and Decision, Jun. 29-Jul. 3, 2009, pp. 1-3, R1-092533.
Fujitsu, "Cross-carrier assignment non-applicable DL transmission", 3GPP TSG-RAN #57bis, Discussion, Jun. 29-Jul. 3, 2009, pp. 1-2, R1-092755.
Alcatel-Lucent ,"Component carrier indication for bandwith extension in LTE-A", 3GPP TSG-RAN WG1 #57bis, Discussion and Decision, Jun. 29-Jul. 3, 2009, pp. 1-5, R1-092330.
Huawei, "Further Considerations on PDCCH for Carrier Aggregation", 3GPP TSG RAN WG1 meeting #57bis, Discussion, Jun. 29-Jul. 3, 2009, 4 pgs. total, R1-092378.
Catt, Ritt, Potevio, "Design of DL Channel for LTE-A with Carrier Aggregation", 3GPP TSG RAN WG1 #57bis, Discussion and Decision, Jun. 29-Jul. 3, 2009, 4 pgs. total, R1-092785.
CMCC, "Discussion on the issues in LS from RAN2", 3GPP TASG RAN WG1 meeting #57-bis, Discussion and Decision, Jun. 29-Jul. 3, 2009, 3 pgs. total, R1-092821.
Japanese Office Action dated Jan. 29, 2013 issued by the Japanese Patent Office in corresponding Japanese Patent Application No. 2012-170085.
Japanese Office Action dated Jan. 29, 2013 issued by the Japanese Patent Office in corresponding Japanese Patent Application No. 2012-170123.
Japanese Office Action dated Jan. 29, 2013 issued by the Japanese Patent Office in corresponding Japanese Patent Application No. 2012-170143.
Korean Communication dated Jan. 23, 2013 issued by the Korean Intellectual Property Office in corresponding Korean Patent Application No. 10-2012-7003803.
"Physical layer procedures", 3GPP TS 36.213 V8.7.0, 3rd Generation Partnership Project, Technical Specification Group Radio Access Network, Evolved Universal Terrestrial Radio Access (E-UTRA), 77 pages total.
Office Action, dated Jan. 24, 2014, issued by the State Intellectual Property Office of the People's Republic of China, in counterpart Application No. 201080035988.5.
Office Action dated Apr. 29, 2014, issued by the U.S. Patent and Trademark Office in corresponding U.S. Appl. No. 13/619,098.

* cited by examiner

Fig. 3

| CARRIER INDICATOR INDEX | CC INDEX |
|---|---|
| 0 | CC #0 |
| 1 | CC #1 |
| 2 | CC #2 |
| 3 | CC #3 |
| 4 | CC #4 |
| 5 | RESERVED |
| 6 | RESERVED |
| 7 | RESERVED |

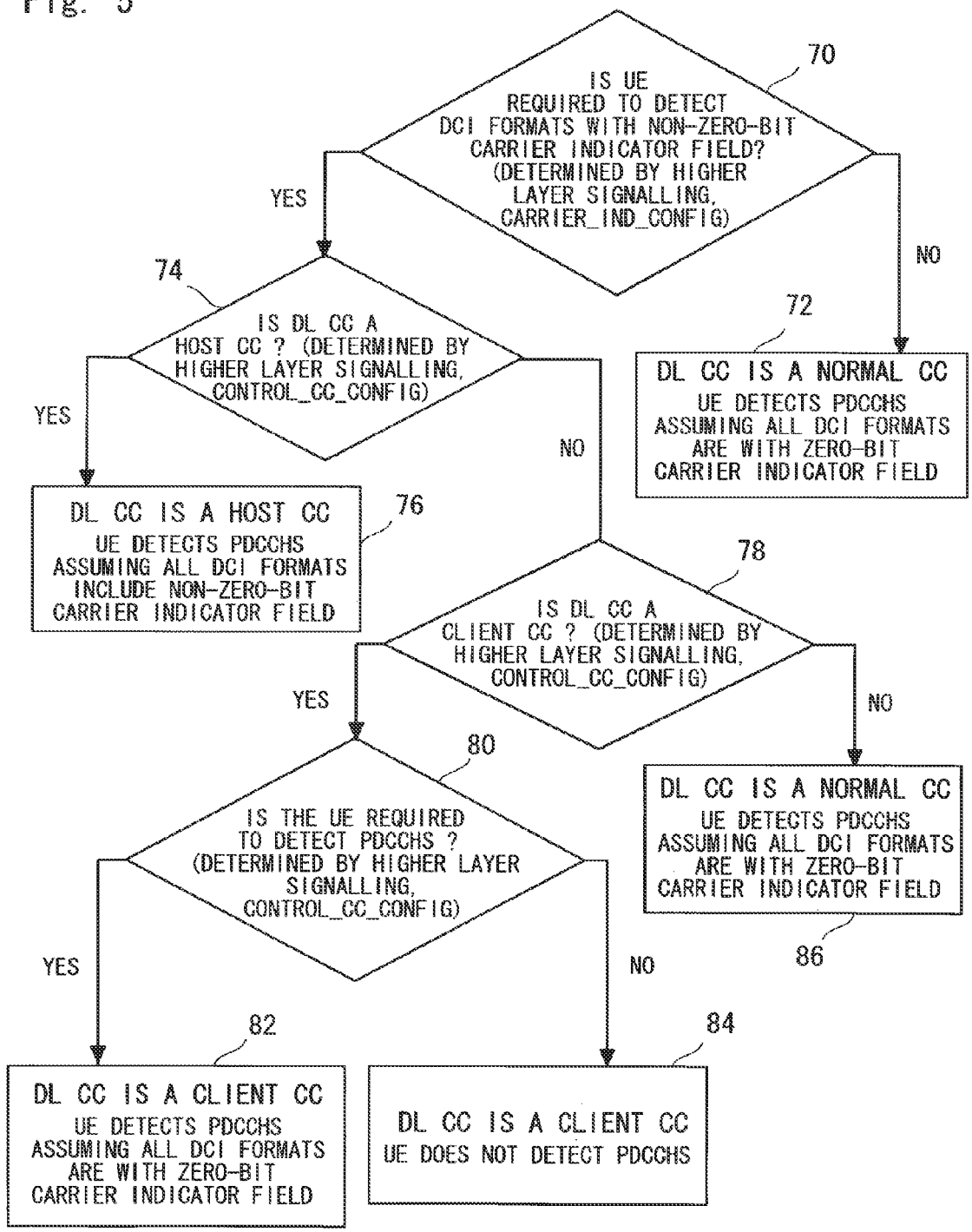

METHOD FOR DETECTING A DOWNLINK CONTROL STRUCTURE FOR CARRIER AGGREGATION

This application is a divisional application of U.S. application Ser. No. 13/389,828 filed Feb. 10, 2012, which was based off National Stage application of PCT/JP2010/063444 filed Aug. 2, 2010, which claims priority from Australia Patent Application No. 2009903831 filed Aug. 14, 2009, which applications are incorporated herein by reference.

TECHNICAL FIELD

The present invention is related to methods for detecting a downlink control structure for carrier aggregation in a communications network.

BACKGROUND ART

Long Term Evolution (LTE) is a mobile network technology standard based on a 3GPP standard. It is a set of enhancements to the Universal Mobile Telecommunications Systems (UMTS) and is designed to increase data rates for mobile wireless users, improve user throughput and make more efficient use of the radio frequency spectrum. LTE-Advanced is currently being standardized by the 3GPP as an enhancement of LTE.

FIG. 1 shows the configuration of a heterogeneous LTE-Advanced or LTE Rel-10 mobile communication network 10. In the system 10, base stations 12, 14, also known as evolved Node Bs (eNode B), support communication for multiple User Equipments (UEs) 16, 18, for example mobile phones, laptops, personal digital assistants. The base stations 12, 14 are fixed and each provide communication coverage for a particular geographical area. Base station 12 is a femto cell, which connects to the service provider's network via broadband, and provides coverage over component carriers CC#0 and CC#1. Base station 14 is a macro cell which provides radio coverage over component carriers CC#0 and CC#1 over different distances for each component carrier.

In the downlink channel, from the base stations 12, 14 to the UEs 16, 18, the LTE standard uses Orthogonal Frequency Division Multiplexing (OFDM). OFDM is a digital multi-carrier modulation method that uses a large number of closely spaced orthogonal sub-carriers to carry data. Orthogonal Frequency Division Multiple Access (OFDMA) is employed as a multiplexing scheme in the LTE downlink. In OFDMA, individual UEs are allocated sub-carriers for a predetermined amount of time. This allows simultaneous data transmission from several users.

The downlink channel supports physical channels, which convey information from higher layers in the LTE stack. Two physical downlink channels are the Physical Downlink Shared Channel (PDSCH), which is used for data transmission and the Physical Downlink Control Channel (PDCCH), which is used for transmitting control information. Scheduling of downlink data reception (in PDSCH) or uplink data transmission in the Physical Uplink Shared Channel (PUSCH) to the UE is typically performed through downlink control signaling using the PDCCH.

SUMMARY OF INVENTION

Technical Problem

A major feature to be introduced for LTE-Advanced is carrier aggregation. Component carriers (CCs) that are contiguous or non-contiguous in frequency may be aggregated. A UE may be configured to aggregate a different number of CCs of possibly different bandwidths in the uplink (UL) and downlink (DL). Carrier aggregation is UE specific, each UE in the same cell may have a different configuration of carrier aggregation.

Once a UE is configured with carrier aggregation, the UE is capable of simultaneously receiving or transmitting on all the CCs that are aggregated. Thus, the UE may be scheduled over multiple CCs simultaneously. The scheduling of downlink assignments and uplink grants for each CC may be via an additional carrier indicator field of 0-3 bits in DCI format(s) for a single CC. In case of 0 bits, there is no carrier indicator.

An example illustrating the carrier aggregation of 5 CCs and the corresponding carrier indicator index to CC index mapping for a PDCCH with the carrier indicator field in CC #2 is shown in FIGS. 2 and 3, respectively.

The use of a carrier indicator in the PDCCH is not without cost. The disadvantages of having a PDCCH carrier indicator include:
  increased complexity in PDCCH scheduling as the scheduling may have to be performed jointly over multiple CCs.
  Increased payload size of up to 3 bits for DCI formats if the carrier indicator is explicitly signaled.
  Potential increased number of blind decoding attempts per CC if UE is expected to blindly detect whether the non-zero-bit carrier indicator field exists in a DCI format and if the CCs can have different bandwidth size.

From the UE's point of view, the increase in blind decoding attempts for a CC is undesirable due to the increased PDCCH processing latency and increased power consumption especially if the UE is required to perform the extra blind detections all the time but the benefit of PDCCH with configurable linkage is only limited to certain scenarios.

It would therefore be desirable to provide a method for detecting carrier aggregation that minimizes the number of PDCCH blind decoding attempts required to be performed by the UE for each CC.

The above discussion of background art is included to explain the context of the present invention. It is not to be taken as an admission that any of the documents or other material referred to was published, known or part of the common general knowledge at the priority date of any one of the claims of this specification.

Solution to Problem

According to one aspect, the present invention provides a method for detecting a downlink control structure for carrier aggregation in a communications network in which data transmission is scheduled by a physical downlink control channel (PDCCH), the method including the steps of, at a UE:
  receiving higher layer signaling enabling carrier aggregation for the UE, and
  reading the PDCCHs of component carriers (CCs), wherein the downlink control information (DCI) in the PDCCHs of each CC is read according to one of a plurality of predefined formats derived from the higher layer signaling.

The higher layer signaling allows the carrier aggregation to be turned on or off, and allows the number of blind decoding attempts as well as the payload sizes of DCI formats to be kept to minimum when cross-carrier control is not needed (depending on deployment scenario or network operator's preference). The higher-layer signaling is transmitted only to UEs with carrier aggregation capability. The default setting assumed by both the eNodeB and the UE before the higher layer signaling is sent is no cross-carrier control, i.e. all DCI formats are with zero-bit carrier indicator fields.

As the PDCCH of each CC is read in accordance with a predetermined DCI format signaled to the UE, the UE power and latency budget for PDCCH processing per CC may be reduced.

The higher layer signaling may indicate that a CC is a host CC that is able to transmit the PDCCHs of client CCs, the predefined format for the DCI in the PDCCHs for the host CC having a non-zero-bit carrier indication field.

Thus, PDCCHs containing carrier indicators are only transmitted on a subset of CCs (say K, where K=1, . . . , M and M is the total number of CCs aggregated for the UE), called the host CCs.

The higher layer signaling may indicate that a CC is a client CC that does not transmit the PDCCHs of other CCs, the predefined format for the DCI in the PDCCHs for the client CC having a zero-bit carrier indication field.

The PDCCHs of client CCs can be transmitted on a host CC. It is possible for a CC to be a host CC as well as a client CC at the same time. In this case, the CC can transmit the PDCCHs of other CCs as well as having its own PDCCHs transmitted on other CCs.

The higher layer signaling may indicate that the UE is not required to detect PDCCHs on a client CC. Instead, the PDCCHs for the client CC are transmitted in the host CC. The method may then further include the step of selectively reading the PDCCHs of CCs so that the UE does not detect PDCCHs on that client CC.

A client CC can thus be configured such that all PDCCHs (with zero-bit carrier indicator) for a UE are not transmitted on the CC. Hence, the UE is not required to detect any PDCCH on the client CC. However, such configuration cannot be applied if the client CC is also a host CC at the same time.

This configuration is beneficial for heterogeneous networks deployment where the interference level of the client CCs can be so high that control channels cannot be reliably transmitted. As PDCCH detection is not required for the client CCs, power saving can be achieved at the UE.

However, for other deployment scenarios such as homogenous networks where frequency diversity gain may be more important, the diversity gain can be harnessed by the UE also detecting PDCCHs on the client CCs.

The higher layer signaling may not indicate that a CC is a client CC or host CC, in this case, the CC may be taken to be a normal CC which is used to transmit all of its own PDCCHs and only its own PDCCHs, the predefined format for the DCI in the PDCCHs for the normal CC having a zero-bit carrier indication field.

Thus, using higher layer signaling, an eNodeB can configure a CC to be one or more of the following types:
Host CC: The CC which can be used for transmission of the PDCCHs of client CC(s) and its own PDCCHs.
Client CC: The CC of which its PDCCHs can be transmitted on a host CC. The client CC can also be used to transmit its own PDCCHs if configured to do so.
Normal CC: The CC which is used to transmit all of its own PDCCHs and only its own PDCCHs (same as in LTE Rel-8).

All PDCCHs transmitted on the host CCs always contain carrier indicators with non-zero bits, even for the PDCCHs that correspond to the host CCs. The actual number of bits for the carrier indicator field can be a function of the actual number of carriers aggregated for the UE (i.e. ceil(log2 M).). The PDCCHs transmitted on the client CCs or the normal CCs do not contain carrier indicators with non-zero bits.

The higher layer signaling may be used to configure CCs as host CCs, client CCs and normal CCs in a semi-static manner according to need or change in the radio channel characteristics in the network. For example, for a heterogeneous network with uncoordinated deployment of femto cells, the interference characteristics of each CC may change several times in a day.

The higher-layer signaling may be UE-specific, as some UEs may not have carrier aggregation capability. Furthermore, for a heterogeneous network, the interference characteristics for each CC experienced by different UEs may be different. As shown in FIG. 1, UE 16 and UE 18 clearly experience different radio characteristics for CC #0 and CC #1.

The host CC may have the same CC bandwidth as a client CC for which they are transmitting PDCCHs. In this case, a CC which is a part of carrier aggregation has to have the same bandwidth size with at least one other CC within the carrier aggregation for it to be eligible as a candidate CC for a host or a client CC.

Advantageous Effects of Invention

The advantage of the invention is that the number of PDCCH blind decoding attempts that the UE has to perform for the host CC does not double due to two different payload sizes for the same DCI format as a result of the difference in CC bandwidth. In conjunction with using the predefined formats as described above, the number of blind decoding attempts required to be performed by the UE may be kept the same as that needed for a normal CC.

BRIEF DESCRIPTION OF DRAWINGS

FIG. 3 is a table providing examples of 3-bit carrier indicator fields.

FIG. 5 is a flowchart showing a method according to an embodiment of the invention.

DESCRIPTION OF EMBODIMENTS

Figure 1:
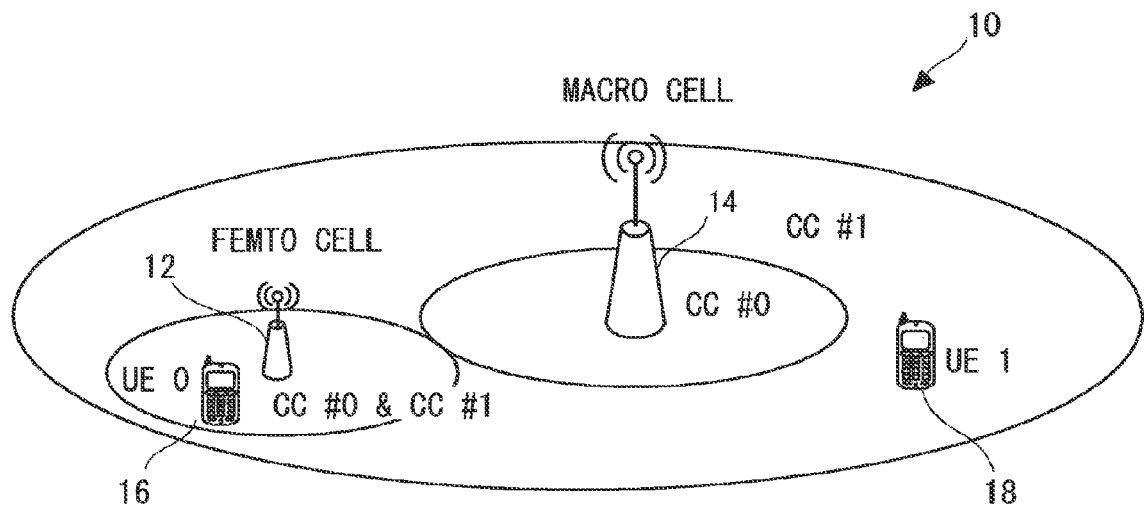
FIG. 1 is a diagram illustrating a configuration of a heterogeneous LTE-Advanced or LTE Rel-10 mobile communication network.
Figure 2:
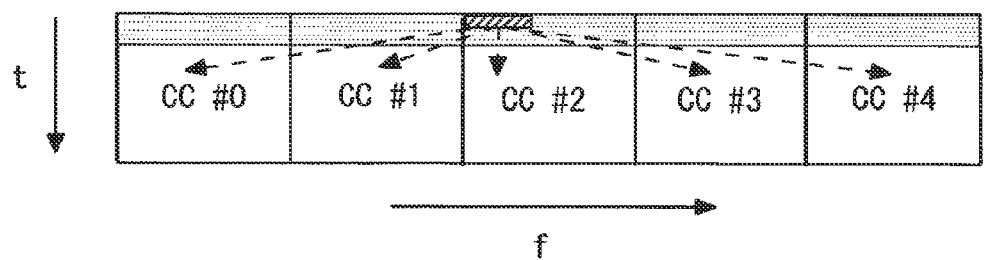
FIG. 2 is a schematic diagram of carrier aggregation of 5 CCs.
Figure 4A:
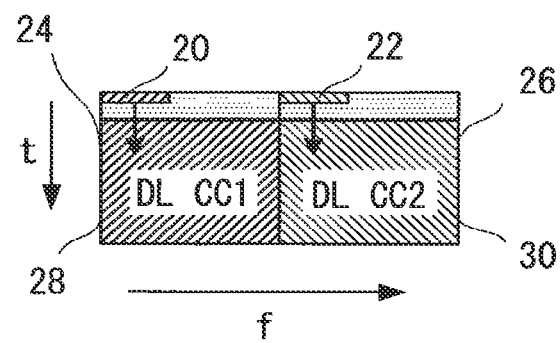
FIG. 4A is schematic diagrams of PDCCH-PDSCH linkage scenarios for two CCs.
Figure 4B:
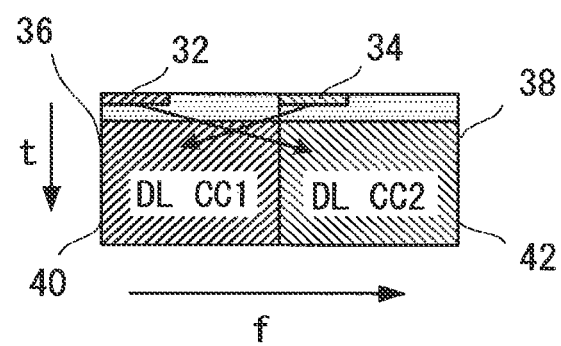
FIG. 4B is schematic diagrams of PDCCH-PDSCH linkage scenarios for two CCs.
Figure 4C:
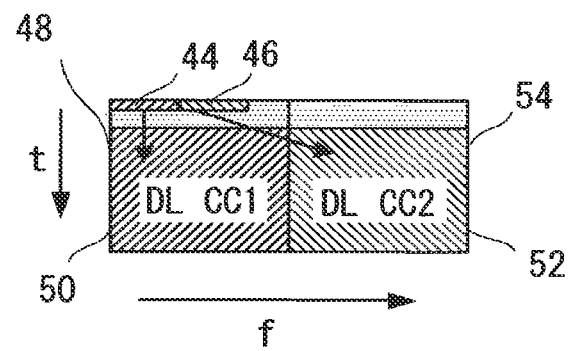
FIG. 4C is schematic diagrams of PDCCH-PDSCH linkage scenarios for two CCs.

FIG. 4A, FIG. 4B and FIG. 4C show possible PDCCH-PDSCH linkage scenarios for an example of two CCs. In FIG. 4A, the PDCCHs 20, 22 are in the same CC 24, 26 as the PDSCHs 28, 30 that they schedule. In FIG. 4B, the PDCCHs 32, 34 are in a different component carrier 36, 38 to the PDSCHs 42, 40 that they schedule. In FIG. 4C, the PDCCHs 44, 46 are both in a single component carrier 48, although the PDCCHs 44, 46 schedule PDSCHs 50, 52 in component carriers 48, 54.

According to the control structure used in the present invention, CCs 24 and 26 are normal CCs, CCs 36, 38 are both host and client CCs, CC 48 is a host CC and CC 54 is a client CC.

With reference to FIG. 5, according to an embodiment of the invention, the PDCCHs of CCs are read according to one of a plurality of predefined formats derived from higher layer signaling between the eNodeB (for example base station 12) and UE (for example UE 16).

At step 70 it is determined if the UE is required to detect DCI formats with non-zero-bit carrier indicator fields. The default setting assumed by both the eNodeB and UE is no carrier aggregation. Thus if no higher layer signaling has been received, at step 72, the UE assumes that the CC is a normal CC, and reads PDCCHs of the CC according to the predefined format of the DCI in the PDCCHs having a zero-bit carrier indication field.

However, if the UE receives higher layer signaling from the eNodeB, such as a carrier_ind_config signal to switch on carrier aggregation, then at step 74, the UE determines if the downlink CC is a host CC. If the higher layer signaling from the eNode B, such as a control_cc_config signal, indicates that a CC is a host CC, the UE reads the PDCCHs of the CC according to the predefined format of the DCI having a non-zero-bit carrier indication field at step 76. The physical signal processing and procedure of PDCCHs detection can be the same as the Rel-8 processing and procedure as specified in TS 36.211 and TS 36.213.

If the higher layer signaling from the eNodeB, such as the control_cc_config signal, instead indicates that the CC is a client CC, the UE determines that the downlink CC is a client CC at step 78. The UE then determines whether the UE is required to detect PDCCHs for that client CC at step 80 via higher layer signaling from the eNodeB, such as a client_cc_config signal.

If the UE is required to detect PDCCHs, at step 82, the UE reads the PDCCHs of the CC according to the predefined format of the DCI having a zero-bit carrier indication field. The physical signal processing and procedure of PDCCHs detection can be the same as the Rel-8 processing and procedure as specified in TS 36.211 and TS 36.213.

If the UE is not required to detect PDCCHs on the client CC, then at step 84, the UE does not attempt to detect PDCCHs.

If no control_cc_config signal is received by the UE (i.e. the higher layer signaling does not indicate that the CC is a host or client), the UE assumes that the downlink CC is a normal CC at step 86. The UE reads PDCCHs of the normal CC according to the predefined format of the DCI in the PDCCHs having a zero-bit carrier indication field. The physical signal processing and procedure of PDCCHs detection can be the same as the Rel-8 processing and procedure as specified in TS 36.211 and TS 36.213.

The UE can therefore detect the downlink control structure for carrier aggregation in a manner which minimizes the number of PDCCH blind decoding attempts required to be performed by the UE to the same as the LTE Rel-8 requirement (a maximum of 44 times).

It is to be understood that various alterations, additions and/or modifications may be made to the parts previously described without departing from the ambit of the present invention, and that, in the light of the above teachings, the present invention may be implemented in software, firmware and/or hardware in a variety of manners as would be understood by the skilled person.

<Incorporation by Reference>

This application is based upon and claims the benefit of priority from Australian patent application No. 2009903831, filed on Aug. 14, 2009, the disclosure of which is incorporated herein in its entirety by reference.

Industrial Applicability

The present invention provides a method for controlling access to a mobile communications networks.

| Reference Signs List | |
|---|---|
| 10 | mobile communication network |
| 12 | femto cell |
| 14 | eNodeB |
| 16, 18 | UE |
| 20, 22, 32, 34, 44, 46 | PDCCH |
| 24, 26, 36, 38, 48, 54 | CC (Component Carrier) |
| 28, 30, 40, 42, 50, 52 | PDSCH |

The invention claimed is:

1. A method implemented in a user equipment (UE) used in a wireless communications network configured to support carrier aggregation, the method comprising:
   receiving, from a base station, downlink control information (DCI) in a physical downlink control channel (PDCCH) on a component carrier (CC),
   wherein the DCI is configured to have either a first DCI format with a non-zero-bit carrier indicator field (CIF) or a second DCI format with a zero-bit CIF,
   wherein the non-zero-bit CIF consists of 3 bits,
   wherein the non-zero-bit CIF includes a carrier indicator index of 0 to 7, and
   wherein the non-zero-bit CIF includes a carrier indicator index according to a table comprising:
   Carrier indicator index CC index

| Carrier indicator | CC |
|---|---|
| 0 | CC #0 |
| 1 | CC #1 |
| 2 | CC #2 |
| 3 | CC #3 |
| 4 | CC #4 |
| 5 | Reserved |
| 6 | Reserved |
| 7 | Reserved. |

2. The method as in claim 1, wherein the DCI has the first DCI format in case the CC is a host CC.

3. The method as in claim 2, wherein the host CC is used to transmit each PDCCH for the host CC and a PDCCH for another CC.

4. The method as in claim 2, wherein the DCI has the second DCI format in case the CC is a client CC or a normal CC.

5. The method as in claim 4, wherein the normal CC is used to transmit each PDCCH for the normal CC and no PDCCH for another CC.

6. The method as in claim 2, wherein the non-zero-bit CIF indicates a client CC.

7. The method as in claim 6, wherein a PDCCH for the client CC is transmitted on the host CC.

8. A method implemented in a base station used in a wireless communications network configured to support carrier aggregation, the method comprising:
   transmitting, to a user equipment (UE), downlink control information (DCI) in a physical downlink control channel (PDCCH) on a component carrier (CC),
   wherein the DCI is configured to have either a first DCI format with a non-zero-bit carrier indicator field (CIF) or a second DCI format with a zero-bit CIF,
   wherein the non-zero-bit CIF consists of 3 bits,
   wherein the non-zero-bit CIF includes a carrier indicator index of 0 to 7, and
   wherein the non-zero-bit CIF includes a carrier indicator index according to a table comprising:

Carrier indicator index CC index

| Carrier indicator index | CC index |
|---|---|
| 0 | CC #0 |
| 1 | CC #1 |
| 2 | CC #2 |
| 3 | CC #3 |
| 4 | CC #4 |
| 5 | Reserved |
| 6 | Reserved |
| 7 | Reserved. |

9. A method implemented in a wireless communications network configured to support carrier aggregation, the method comprising:
   transmitting, from a base station to a user equipment (UE), downlink control information (DCI) in a physical downlink control channel (PDCCH) on a component carrier (CC),
   wherein the DCI is configured to have either a first DCI format with a non-zero-bit carrier indicator field (CIF) or a second DCI format with a zero-bit CIF,
   wherein the non-zero-bit CIF consists of 3 bits,
   wherein the non-zero-bit CIF includes a carrier indicator index of 0 to 7, and
   wherein the non-zero-bit CIF includes a carrier indicator index according to a table comprising:
   Carrier indicator index CC index

| Carrier indicator index | CC index |
|---|---|
| 0 | CC #0 |
| 1 | CC #1 |
| 2 | CC #2 |
| 3 | CC #3 |
| 4 | CC #4 |
| 5 | Reserved |
| 6 | Reserved |
| 7 | Reserved. |

10. A user equipment (UE) used in a wireless communications network configured to support carrier aggregation, the UE comprising:
   a receiving unit to receive, from a base station, downlink control information (DCI) in a physical downlink control channel (PDCCH) on a component carrier (CC),
   wherein the DCI is configured to have either a first DCI format with a non-zero-bit carrier indicator field (CIF) or a second DCI format with a zero-bit CIF,
   wherein the non-zero-bit CIF consists of 3 bits,
   wherein the non-zero-bit CIF includes a carrier indicator index of 0 to 7, and
   wherein the non-zero-bit CIF includes a carrier indicator index according to a table comprising:
   Carrier indicator index CC index

| Carrier indicator index | CC index |
|---|---|
| 0 | CC #0 |
| 1 | CC #1 |
| 2 | CC #2 |
| 3 | CC #3 |
| 4 | CC #4 |
| 5 | Reserved |
| 6 | Reserved |
| 7 | Reserved. |

11. A base station used in a wireless communications network configured to support carrier aggregation, the base station comprising:
   a transmission unit to transmit, to a user equipment (UE), downlink control information (DCI) in a physical downlink control channel (PDCCH) on a component carrier (CC),
   wherein the DCI is configured to have either a first DCI format with a non-zero-bit carrier indicator field (CIF) or a second DCI format with a zero-bit CIF,
   wherein the non-zero-bit CIF consists of 3 bits,
   wherein the non-zero-bit CIF includes a carrier indicator index of 0 to 7, and
   wherein the non-zero-bit CIF includes a carrier indicator index according to a table comprising:
   Carrier indicator index CC index

| Carrier indicator index | CC index |
|---|---|
| 0 | CC #0 |
| 1 | CC #1 |
| 2 | CC #2 |
| 3 | CC #3 |
| 4 | CC #4 |
| 5 | Reserved |
| 6 | Reserved |
| 7 | Reserved. |

12. A wireless communications network configured to support carrier aggregation, the wireless communications network comprising:
   a base station to transmit downlink control information (DCI) in a physical downlink control channel (PDCCH) on a component carrier (CC); and
   a user equipment (UE) to receive the DCI from the base station,
   wherein the DCI is configured to have either a first DCI format with a non-zero-bit carrier indicator field (CIF) or a second DCI format with a zero-bit CIF,
   wherein the non-zero-bit CIF consists of 3 bits,
   wherein the non-zero-bit CIF includes a carrier indicator index of 0 to 7, and
   wherein the non-zero-bit CIF includes a carrier indicator index according to a table comprising:
   Carrier indicator index CC index

| Carrier indicator index | CC index |
|---|---|
| 0 | CC #0 |
| 1 | CC #1 |
| 2 | CC #2 |
| 3 | CC #3 |
| 4 | CC #4 |
| 5 | Reserved |
| 6 | Reserved |
| 7 | Reserved. |

* * * * *

UNITED STATES PATENT AND TRADEMARK OFFICE
CERTIFICATE OF CORRECTION

| | | |
|---|---|---|
| PATENT NO. | : 8,837,416 B2 | Page 1 of 1 |
| APPLICATION NO. | : 13/619060 | |
| DATED | : September 16, 2014 | |
| INVENTOR(S) | : Boon Loong Ng | |

It is certified that error appears in the above-identified patent and that said Letters Patent is hereby corrected as shown below:

In the Claims

Column 6, Line 29: Claim 1, delete "CC" and insert -- CC index --

Signed and Sealed this
Tenth Day of February, 2015

Michelle K. Lee
*Deputy Director of the United States Patent and Trademark Office*